UNITED STATES PATENT OFFICE.

JOHN L. KIDWELL, OF WASHINGTON, DISTRICT OF COLUMBIA.

IMPROVED ROOFING-CEMENT.

Specification forming part of Letters Patent No. 82,419, dated September 22, 1868.

*To all whom it may concern:*

Be it known that I, JOHN L. KIDWELL, of Washington, District of Columbia, have invented a new Roofing-Cement, for covering boards, slats, shingles, paper, felt, cloth, wooden wall-paper, brick or stone, &c., of which the following is a specification:

To enable others skilled in the art to make and use my invention, I will proceed to describe it.

I take one hundred parts, by weight, of fresh hydraulic cement or Portland cement, (artificial;) one hundred to two hundred parts, by weight, of wood or coal tar, (according to its consistency;) one to two parts, by weight, of pulverized sulphur; one to five parts, by weight, of naphthaline or dead-oil. Paraffine-oil, pitch, or rosin may in some measure be substituted for the naphthaline. The tar and naphthaline (or equivalents) are gently heated to complete fusion in a flat sheet-iron kettle, the melting mass being constantly stirred. The dry cement, together with the pulverized sulphur, previously well mixed, is gradually passed from a sifter into the melted tar and naphthaline, while the mixture is continually agitated and stirred until the whole has acquired the desired plasticity. By the addition of pulverized graphite or mineral colors, black, slate-colored, red, or brown, &c., roofing-cement may be prepared.

If it is desirable to manufacture this cement composition ready for exportation, it is, when melted, at once run off into barrels or kegs, from a suitable aperture or pipe in the iron kettle. It soon hardens, and may then be stored for any length of time. When used as a roofing-cement it requires simple remelting in a kettle.

If slats are used, (to economize wood,) the spaces between them must be covered with felt or endless machine-paper, and the tar-cement applied next with a tar-brush. If a second or third layer of paper, felt, &c., is taken to gain increased strength, each layer is coated with the cement, which must be as hot as possible.

After the covering of the roof (or especially of pavements) is completed, fire-proof materials, such as powdered minerals, sand, gravel, asbestus, mica, marble or coal dust, ashes, iron cinder, slags, or finely-divided metals, such as iron filings or turnings, zinc-dust, &c., may be sprinkled into the yet plastic mass, or may be forced or pressed into the cement composition by means of iron rollers, which, for pavements, ought to be hot.

This composition of cement is well adapted, not only for roofing, but also for sidewalks, floors, lining of cisterns, aquariums, sewers, &c.

Having thus described my invention, what I claim is—

1. A water and fire proof composition for roofing, flooring, &c., prepared of hydraulic cement, tar, sulphur, and naphthaline, or equivalents, substantially as described and set forth.

2. The above cement composition, incorporated with powdered minerals or metallic ingredients, substantially as described and set forth.

JNO. L. KIDWELL.

Witnesses:
E. DUEMPELMAN,
G. B. BARNARD.